(12) United States Patent
Patel et al.

(10) Patent No.: US 7,671,862 B1
(45) Date of Patent: Mar. 2, 2010

(54) SYSTEMS AND METHODS FOR PROVIDING AN ENHANCED GRAPHICS PIPELINE

(75) Inventors: Amar Patel, Redmond, WA (US); Charles N. Boyd, Woodinville, WA (US); David R. Blythe, Kirkland, WA (US); Jeff M. J. Noyle, Kirkland, WA (US); Michael A. Toelle, Bellevue, WA (US); Stephen Harry Wright, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 10/934,241

(22) Filed: Sep. 3, 2004

Related U.S. Application Data

(60) Provisional application No. 60/567,490, filed on May 3, 2004.

(51) Int. Cl.
*G06F 15/00* (2006.01)
*G06T 1/00* (2006.01)
*G06T 1/20* (2006.01)

(52) U.S. Cl. ............... 345/501; 345/502; 345/503; 345/504; 345/505; 345/506; 345/613; 345/581

(58) Field of Classification Search ......... 345/501–506, 345/613, 581
See application file for complete search history.

(56) References Cited

U.S. PATENT DOCUMENTS

| | | | |
|---|---|---|---|
| 5,481,669 A | 1/1996 | Poulton et al. | 345/505 |
| 5,821,940 A | 10/1998 | Morgan et al. | 345/420 |
| 6,483,505 B1 | 11/2002 | Morein et al. | 345/419 |
| 6,496,190 B1 | 12/2002 | Driemeyer et al. | 345/619 |
| 6,606,092 B2 | 8/2003 | Driemeyer et al. | 345/426 |
| 6,724,394 B1 * | 4/2004 | Zatz et al. | 345/581 |

(Continued)

FOREIGN PATENT DOCUMENTS

EP    1 182 618 A2    2/2002

OTHER PUBLICATIONS

Mental Ray Version 3.0, 2001, http://www.uni-duesseldorf.de/URZ/hardware/parallel/local/xsi/XSI_html/files/mental_ray/manual/.*

(Continued)

*Primary Examiner*—Jin-Cheng Wang
(74) *Attorney, Agent, or Firm*—Woodcock Washburn LLP

(57) ABSTRACT

An enhanced graphics pipeline is provided that enables common core hardware to perform as different components of the graphics pipeline, programmability of primitives including lines and triangles by a component in the pipeline, and a stream output before or simultaneously with the rendering a graphical display with the data in the pipeline. The programmer does not have to optimize the code, as the common core will balance the load of functions necessary and dynamically allocate those instructions on the common core hardware. The programmer may program primitives using algorithms to simplify all vertex calculations by substituting with topology made with lines and triangles. The programmer takes the calculated output data and can read it before or while it is being rendered. Thus, a programmer has greater flexibility in programming. By using the enhanced graphics pipeline, the programmer can optimize the usage of the hardware in the pipeline, program vertex, line or triangle topologies altogether rather than each vertex alone, and read any calculated data from memory where the pipeline can output the calculated information.

49 Claims, 10 Drawing Sheets

U.S. PATENT DOCUMENTS

| | | | | |
|---|---|---|---|---|
| 6,765,584 | B1* | 7/2004 | Wloka et al. | 345/584 |
| 6,828,975 | B2 | 12/2004 | Noyle | 345/522 |
| 6,839,062 | B2 | 1/2005 | Aronson et al. | 345/522 |
| 6,864,893 | B2* | 3/2005 | Zatz | 345/503 |
| 6,897,871 | B1* | 5/2005 | Morein et al. | 345/501 |
| 7,015,909 | B1 | 3/2006 | Morgan, III et al. | 345/426 |
| 7,091,979 | B1* | 8/2006 | Donovan | 345/530 |
| 7,159,041 | B2* | 1/2007 | Boyd et al. | 709/246 |
| 7,176,917 | B1 | 2/2007 | Morgan et al. | 345/426 |
| 7,202,872 | B2* | 4/2007 | Paltashev et al. | 345/555 |
| 2003/0020741 | A1* | 1/2003 | Boland et al. | 345/700 |
| 2003/0169269 | A1 | 9/2003 | Sasaki et al. | 345/581 |
| 2004/0012597 | A1* | 1/2004 | Zatz et al. | 345/501 |
| 2004/0012599 | A1 | 1/2004 | Laws | 345/506 |
| 2004/0169671 | A1* | 9/2004 | Aronson et al. | 345/700 |
| 2004/0237074 | A1 | 11/2004 | Aronson et al. | 717/158 |
| 2005/0122334 | A1* | 6/2005 | Boyd et al. | 345/520 |
| 2005/0140672 | A1 | 6/2005 | Hubbell | 345/426 |
| 2005/0225670 | A1 | 10/2005 | Wexler et al. | 348/441 |
| 2005/0275760 | A1* | 12/2005 | Gritz et al. | 348/746 |

OTHER PUBLICATIONS

Haaker, T., et al., "A distributed frame buffer within a window-oriented high performance graphics system," *Proceedings of the workshop on Graphics Hardware*, Berlin, Springer, 1991, 261-273.

Singh, S., et al., "Virtual hardware for graphics applications using PPGAs," *IEEE*, 1994, 49-58.

Styles, H., et al., "Customising graphics applications: techniques and programming interface," *IEEE*, 2000, 77-87.

"Now 3-D Cad Images can be Moved in Real Time," *Electronics*, 1986, 59(28), 97-100.

Bankston, J. et al., "Pipeline Processing with Modula-2," *J. Pascal Ada Modula-2*, 1986, 5(5), 46-51.

Bolz, J. et al., "Sparse Matrix Solvers on the GPU: Conjugate Gradients and Multigrid," *ACM Trans. on Graphics*, 2003, 22(3), 917-924.

Cignoni, P. et al., "BDAM—Batched Dynamic Adaptive Meshes for High Performance Terrain Visualization," *Computer Graphics Forum*, 2003, 22(3), 505-514.

Hasenfratz, J.-M. et al., "A Survey of Real-Time Soft Shadows Algorithms," *Computer Graphics Forum*, 2003, 22(4), 753-774.

Lefohn, A.E. et al., "A Streaming Narrow-Band Algorithm: Interactive Computation and Visualization of Level Sets," *IEEE Trans. on Visualization and Computer Graphics*, 2004, 10(4), 442-433.

Sloan, P.P. et al., "Clustered Principal Components for Precomputed Radiance Transfer," *ACM Trans. on Graphics*, 2003, 22(3), 382-391.

Wei, X.M. et al., "The Lattice-Boltzmann Method for Simulating Gaseous Phenomena," *IEEE Trans. on Visualization and Computer Graphics*, 2004, 10(2), 164-176.

Mental Ray, 2001, Section 3.20 and Chapter 4, http://www.unidues-seldorf.de/URZ/hardware/parallel/local/xsi/XSI_html/Files/Mental_ray/manual/ray-Contents.ntml.

* cited by examiner

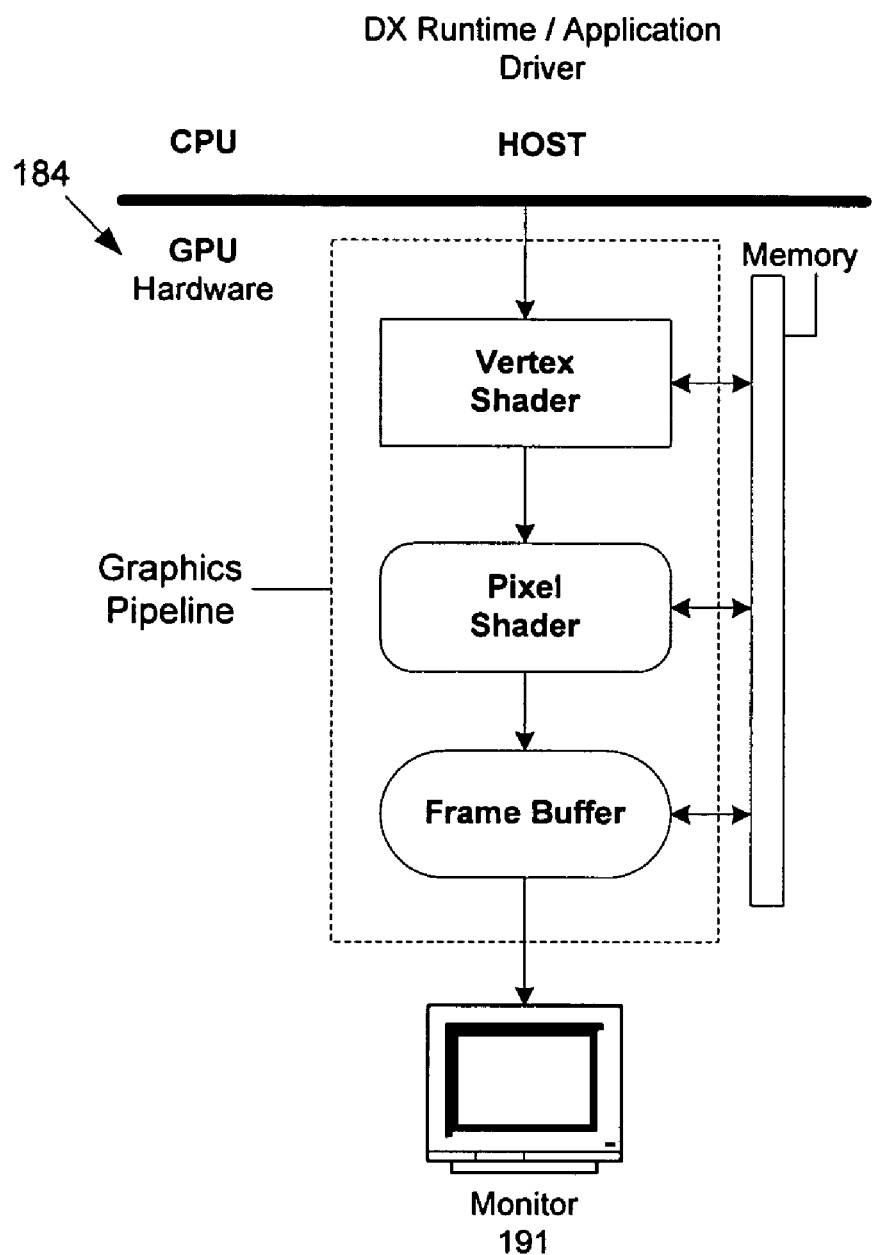
FIG. 1A – Prior Art

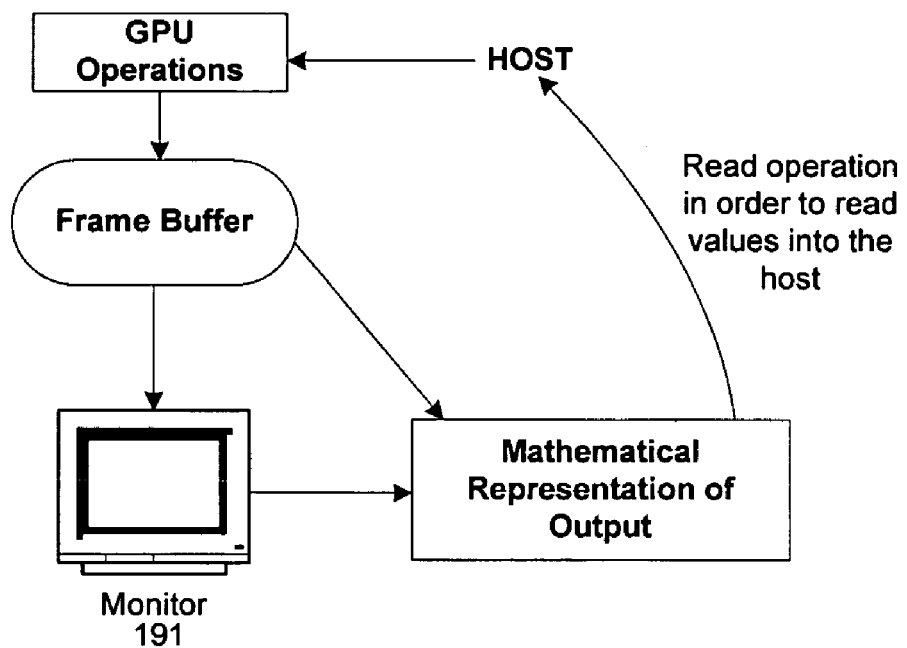
FIG. 1B – PRIOR ART

SYSTEMS AND METHODS FOR PROVIDING AN ENHANCED GRAPHICS PIPELINE

CROSS REFERENCE TO RELATED APPLICATIONS

This patent application claims priority to U.S. Provisional Application No. 60/567,490, filed May 3, 2004.

This application is related by subject matter to co-pending U.S. application Ser. No. 10/934,249, filed concurrently herewith and U.S. application Ser. No. 10/933,850, filed concurrently herewith.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003-2004, Microsoft Corp.

FIELD OF THE INVENTION

The present invention is directed to a graphics processing unit (GPU) that enables an enhanced graphics pipeline using software developed for hardware to add new and improved functionality in the graphics pipeline.

BACKGROUND

Computer systems are commonly used for displaying graphical objects on a display screen. The purpose of three dimensional (3-D) computer graphics is generally to create two-dimensional (2-D) images on a computer screen that realistically represent an object or objects in three dimensions. In the real world, objects occupy three dimensions having a real height, a real width and a real depth. A photograph is an example of a 2-D representation of a 3-D space. 3-D computer graphics are generally like a photograph in that they represent a 3-D world on the 2-D space of a computer screen, except the underlying image is generally modeled with 3-D geometry and surface textures.

Images created with 3-D computer graphics are used in a wide range of applications, from video entertainment games to aircraft flight simulators, to portray in a realistic manner an individual's view of a scene at a given point in time. Well-known examples of 3-D computer graphics include special effects in Hollywood films such as Terminator II, Jurassic Park, Toy Story and the like.

One industry that has seen a particularly tremendous amount of growth in the last few years is the computer game industry and the current generation of computer games apply 3-D graphics techniques in an ever increasing fashion. At the same time, the speed of play is driven faster and faster. This combination has fueled a genuine need for rapid and flexible rendering of 3-D graphics in relatively inexpensive systems.

To create a 3-D computer graphical representation, typically, the objects to be depicted are represented as mathematical models within the computer. For instance, 3-D models can be made up of geometric points within a coordinate system consisting of an x, y and z axis, for example, corresponding to width, height, and depth, respectively. Objects are defined by a series of points, called vertices. The location of a point, or vertex, is defined by its x, y and z coordinates (or other coordinate system). In graphics terminology, one vertex is a point, two vertices define a line, or a line segment, and three vertices define a triangle where all three are "primitives." When three or more of these points are connected, a polygon is formed, with the triangle being the simplest polygon.

Rendering and displaying three dimensional (3-D) graphics on screen typically involves many calculations and computations. In a simple graphics system, such computations occur according to some level of cooperative or shared processing by the central processing unit (CPU) and the graphics processing unit (GPU). In an exemplary scenario, after instructions are processed and some initial computations occur in the CPU, a set of coordinate points or vertices that define the object to be rendered are stored in video memory for further processing by the GPU in the graphics pipeline. A tessellator may break the graphics data down into simple polygons according to predetermined algorithms designed to efficiently cover the surface of the object being represented—this is known as tessellation. Currently, in most graphics pipelines, the data may then be operated upon by one or more procedural shaders, depending upon the instructions that are delivered to the GPU.

Procedural shaders are specialized processing subunits of the GPU for performing specialized operations on graphics data. An example of a procedural shader is a vertex shader, which generally operates on vertices. For instance, a vertex shader can apply computations of positions, colors and texturing coordinates to individual vertices. Vertex shaders perform either fixed or programmable function computations on streams of vertices specified in video memory of the graphics pipeline. Vertex shaders cannot generate additional geometry (vertices), but rather operate on the vertices that are specified for algorithmic transformation via the program downloaded to the vertex shader from the host.

Generally staged after the vertex shader, another example of a procedural shader is a pixel shader. For instance, the outputs of the vertex shader can be passed through a non-programmable unit, called the setup engine, which is a non-procedural shader unit that defines the gamut of pixels on which the pixel shader operates. The gamut of pixels can then be operated on by a pixel shader, which in turn operates on each individual pixel. From the pixel shader, the output values are sent to the frame buffer where they wait to be displayed to the screen, or await retrieval by the host system. While 3-D geometry is generally meshed together with triangles (sets of 3 vertices), currently, there are no procedural shaders that operate directly upon triangles as such (sets of three related vertices), or line segments, or lines, either (sets of two related vertices).

Where programmable, it is noted that the term "shader" is subject to misleading use because a "shader" can refer to the hardware subunit of the GPU that performs the shading and a "shader" can refer to the set of instructions or tokens downloaded to the GPU that are subsequently loaded into memory, e.g., register storage, used by the shader (hardware) to perform the shading. The term can also refer to both working together. Thus, while sometimes the word is used herein generically to refer to either, and accordingly, should be taken to encompass both meanings, where the term "subunit" is also used in connection with the term shader, the terms should be construed to refer to the subunit of the GPU that performs the processing associated with the shading.

It is also noted that the term "frame buffer" in today's graphics architectures does not generally refer to a pre-partitioned, pre-allocated and pre-defined portion of video memory reserved solely for the output of the setup engine or pixel processing unit of the graphics processing unit, but rather the frame buffer generally refers to any memory (generally video memory included for interoperation with the GPU) used in connection with rasterization and/or digital to analog converter (DAC)-out processes. In this regard, though the term rasterization is sometimes used more generally, the processing performed in connection with pixel processing or setup engine processing in the graphics pipeline is generally referred to as rasterization. Scan-out or DAC-out, on the other hand, is the process of transmitting signals to a monitor or LCD based on the contents of the frame buffer.

Today, the values in the frame buffer may be used for purposes other than for display to a screen, but such use is limited. For instance, it may be desired to return the values to an application on the host after they have been operated on by a pixel shader or vertex shader for saving, printing, further transformation, etc. In these instances, the values "technically" may be read; however, retrieving the values in video memory, other than the limited portions devoted to buffering images for display, is an extremely arduous task that requires cooperation with host memory, the CPU and advanced knowledge about how video memory is arranged for use in connection with the particular graphics hardware. This is especially true if any portion of the video memory is to be read other than the frame buffer. While not impossible, in practice, it is far from straightforward to read the intermediate storage of video memory used for output by the tessellator, vertex shaders and pixel shaders. In some cases, the outputs of tessellators, vertex shaders and pixel shaders may never reach video memory, but instead may be limited to a specialized data path for use between GPU graphics processing stages (e.g., the output from a vertex shader is generally transmitted to a pixel shader via a pre-defined path without reaching video memory). GPU operations occur so fast and in accordance with specialized architecture that reading intermediate video memory storage in current graphics pipelines is not feasible until the output reaches the frame buffer for rasterization or other operation.

While the frame buffer memory, which receives the output of the pixel shader in a conventional system, may be accessed in a known fashion by the host CPU to save (or otherwise operate on) graphics data, such as images, processed by the GPU, the data must still be accessed and retrieved back to the host CPU for such further operations. FIG. 1B illustrates what must be done to the output of data from a frame buffer memory to achieve further operation upon the data by the graphics pipeline. After operation of a cycle of pipeline processing as represented by the GPU operations and after retrieving the values from the frame buffer back to the host CPU, the CPU then cooperates to send the values back through the graphics pipeline for any further processing. Thus, what is desired in the state of the art is two main things: (1) the ability to re-use, i.e., re-process, data that is output from sub-components, such as a vertex shader or a pixel shader, inside the graphics pipeline prior to reaching frame buffer memory and (2) the ability to do so recursively without implicating host resources and memory.

As illustrated in FIG. 1A, computing systems are divided between the host CPU and the graphics hardware. The CPU facilitates the making of calls to graphics APIs by applications and services requesting their use. Conventionally, the application and drivers are located on the CPU side and information from those sources is sent to be displayed on a monitor. First, the information is sent from the CPU to the GPU, as packaged by the CPU according to APIs. Then, the information from the application waits in memory until it is accessed by the vertex shader. After the vertex shader concludes its operations, the information, as output from the vertex shader, is output through a special data path to the pixel shader (placing the output in video memory is generally too slow) until it is accessed by the pixel shader, and the vertex shader sits idle or continues processing more data. After the pixel shader has performed its operations, the information is placed in a frame buffer to be scanned out to a display, or sent back to the host for further operation.

Specialized 3-D graphics APIs have been developed that expose the specialized functionality of today's vertex and pixel shaders. In this regard, a developer is able to download instructions, or small programs, to a vertex shader unit that effectively program the vertex shader to perform specialized behavior. For instance, APIs expose functionality associated with increased numbers of registers in vertex shaders, e.g., specialized vertex shading functionality with respect to floating point numbers at a register level. In addition, it is possible to implement an instruction set that causes the extremely fast vertex shader to return only the fractional portion of floating point numbers. A variety of functionality can be achieved through downloading these instructions, assuming the instruction count limit of the vertex shader and associated the register storage is not exceeded.

Most notably, the functionality of a vertex shader stage is for transformation, lighting and occasionally texture transformation. Basically, transformation is taking position data, the data as to where vertices should be when displayed, and transforming it to data for the monitor, a two dimensional screen space. Traditionally, vertex transformation processes either pass position data without modification or modify the data using matrices. The vertex shader stage is usually limited to performing transformation functions, lighting functions, and some texture functions.

As games increase the level of graphics detail, polygon density increases and lighting and other vertex shading techniques become more important as a vertex processing step. Static lighting, a popular form of lighting due to its high quality, is usually calculated in the vertex shader and stored as a texture. Because it places all the lighting information into textures, it is difficult to modify the information during runtime making dynamic lighting possible only if instructions per vertex are given beforehand. Occasionally, the vertex shader applies a matrix transform to vertex coordinates to texture coordinates. This usually occurs for spherical and cubical reflection mapping and texture animation.

The typical types of lighting carried out by a vertex shader include: positional, directional or spotlight. To add such lighting, the mathematical computations, mostly matrix manipulation, change the vertices to reflect a type of lighting defined in an application. There are different lights, typically mimicking reality where light sources like sunlight and a street light have different properties. These lights can be positional, directional or spotlights creating a multitude of combinations for the vertex shader stage to compute.

Thus, the geometry processing performed using a vertex shader includes some type of transformation to apply to the data, lighting environment for vertices, and material for the texture transformation. Both fixed function and programmable vertex shaders usually function in those ways during that stage in the pipeline. If an application has more information to be processed in these areas, there will be a bottleneck in the vertex shader and other components of the graphics pipeline will sit idle.

With respect to pixel shaders, specialized pixel shading functionality can be achieved by downloading instructions to the pixel shader. For instance, functionality is exposed that provides a linear interpolation mechanism in the pixel shader. Furthermore, the functionality of many different operation modifiers are exposed to developers in connection with instruction sets tailored to pixel shaders. For example, negating, remapping, biasing, and other functionality are extremely useful for many graphics applications for which efficient pixel shading is desirable, yet as they are executed as part of a single instruction they are best expressed as modifiers to that instruction. In short, the above functionality is advantageous for graphics operations, and their functional incorporation into already specialized pixel and vertex shader sets of instructions adds tremendous value from the perspective of ease of development and improved performance. A variety of functionality can thus be achieved through downloading these instructions, assuming the instruction count limit and other hardware limitations of the pixel shader are not exceeded.

Although the pixel shader does perform some matrix operations (e.g., vector transformations for lighting), it may be useful to think of the functionality of a pixel shader as having more or less straightforward mathematical computational capabilities, as opposed to the more complex matrix calculations performed by the vertex shader to transform vertices, wherein each vertex may be represented by many values that require processing. The math involved with a pixel shader is likely floating point calculations and these calculations shade pixels to create reflectivity, glossiness, and bumpiness. There are limitations to the number of calculations that can be performed as information is passed through the pixel shader. Because of these limitations, some information requires multi-pass operations to create multiple textures on each pixel. And each pass encompasses several clock cycles in the pipeline.

The vertex shader computes matrices on a given vertex while the pixel shader can compute most floating point operations. There are instances when a programmer may want to see the mathematical transformations of the vertex and not the values as a screen display. At this point a programmer would have to read memory from the frame buffer which, as discussed, is prohibitive.

Pixel shaders and vertex shaders are able to operate on pixels and vertices. In graphics programming, primitives are the basic shapes out of which any given three dimensional graphic is created. Regularly used and defined primitives include a vertex, a line, and a triangle. Today, pixel shaders and vertex shaders are able to operate with given instructions on a vertex. Even if the shaders are programmable, the shaders are only able to operate on vertices, or points, as primitives.

When these specific shaders, either the pixel or vertex shaders, operate in a graphics pipeline, there are regular bottlenecks due to the operations that occur in each stage. These bottlenecks can be solved if a programmer tries to limit and balance the instructions sent to each shader for every vertex. However, when designing graphics for an intricate 3-D display, like a game, balancing the number of instructions becomes an overwhelming task. Most programmers do not implement any sort of optimization until the graphics are noticeably slower in a given program. Even in the best optimization schemes that a programmer may use, hardware will be found sitting idle and unused waiting for information to pass through, simply because of the variance associated with different kinds of tasks requested of a graphics subsystem. Furthermore, in order to optimize any graphics program, a programmer first must identify the source of the bottleneck which can be a tedious task. Thus, it would be desirable to be able to dynamically reconfigure the cores of a graphics subsystem so that the core processing of the data is automatically tailored to the task being requested to be performed.

Thus, the rendering of graphics data in a computer system is a collection of resource intensive processes. The process of shading, i.e., the process of performing complex algorithms upon set(s) of specialized graphics data structures, used to determine values for certain primitives, such as color, etc. associated with the graphics data structures, exemplifies such a computation intensive and complex process. Generally the process of shading has been normalized to some degree. By passing source code designed to work with a shader into an application, a shader becomes an object that the application may create/utilize in order to facilitate the efficient drawing of complex video graphics. Vertex shaders and pixel shaders are examples of such shaders.

Thus, the introduction of programmable operations on a per vertex and per pixel basis has become more wide spread in modern graphics hardware. This general programmability enables the potential for limited creative algorithms at increased performance levels. However, in addition to those noted above, there are some limitations to what can be achieved today. Typically, with present day rendering pipelines at the vertex and pixel shaders, a stream of geometry data is input to the vertex shader to perform some operation of the vertices, as a result of which the geometry data is transformed to pixel data, outputting a stream of pixel data. The vertex shader may receive instructions which program the vertex shader to perform specialized functionality, but there are limits to the size and complexity of the vertex shader instructions. Similarly, a pixel shader can optionally perform one or more transformations to the data outputting a stream of pixel data. The pixel shader may also receive instructions which program the pixel shader to perform specialized functionality, but there are limits to the size and complexity to the pixel shader instructions.

Today, programmers regularly use vertex shaders and pixel shaders. The current programmable hardware has somewhat limited programmable mechanisms, however, that do not allow a programmer to specify the re-use of values prior to reaching the end of the pipeline before the values are rasterized. Programmers may try to balance their use of different components in the graphics pipeline to avoid bottlenecks in one or more of the shaders, however, the graphics hardware is fixed. While some specialized hardware is built for specialized tasks having specialized combinations and arrangements of procedural shaders for those specialized tasks, the hardware cannot be rearranged for other tasks. Thus, when performing tasks other than those specialized tasks, and information needs to be modified specifically by instructions for only one of the shaders, the modification may have to wait, perhaps unacceptably so depending upon the application. Furthermore, while vertices can be operated upon by shaders, however, the programmer is unable to specify via graphics APIs operations that work directly on other primitives as such. In other words, with the exception of vertices, a programmer is unable to arbitrarily package primitives for processing in the graphics pipeline as primitives.

Tesselation is a process that typically takes place at the beginning of a graphics pipeline which involves covering of a bounded geometric region without gaps or overlaps by congruent plane figures of one type or a few types. While existing tesselators implement a few basic algorithms for creating a grid of new vertices based on a handful of control-point vertices, the process is based on pre-fixed algorithms and is limited to the front end of the pipeline, and is therefore not programmable to create additional arbitrary geometry in the middle of the pipeline after processing by a procedural shader. Moreover, once vertices are generated by the tesselator, there is nowhere else in the pipeline where vertices can be generated. In other words, today's vertex shaders may be able to receive, process and output vertices, but they are unable to generate new vertices.

It would thus be desirable to implement systems and methods that overcome the shortcomings of present programmability in connection with present graphics pipelines architectures, APIs and hardware due to limitations in instruction count, limitations in form of output and the lack of sharing of data in the pipeline.

SUMMARY OF THE INVENTION

In consideration of the above-identified shortcomings of the art, the present invention provides systems and methods for optimizing the use of hardware in the graphics pipeline by having a common core which may function as either a pixel shader, a vertex shader or a geometry shader, where the geometry shader is a programmable shader which can operate on any primitives including triangles, as input and output so that graphics data can be operated upon more directly without transforming the data to vertices, or other intermediate format. Additionally, with the invention, new vertices can be generated inside the pipeline, either at the tessellation stage or by a geometry shader. In one embodiment, a tesselator may be used to generate geometry inside the pipeline programmatically after a procedural shader has operated on graphics data and a geometry shader may be used to supplement existing geometry in a programmable way to achieve on-the-fly alteration of the graphics shapes and effects applied inside the pipeline.

Advantageously, the common core is programmable or dynamically configurable as a pixel shader, a vertex shader, or a geometry shader, so a graphics pipeline can employ all pixel shaders, all vertex shaders, or all geometry shaders, or a combination of shaders based upon optimization of the computational needs for a specific application. The common cores can be dynamically configured (and reconfigured) depending upon the demands on the graphics pipeline made by the host.

With respect to a geometry shader, via a stream output, the graphics APIs and associated hardware of the invention enable application developers to programmably re-circulate data once inside the graphics pipeline without implicating the CPU's help in reading video memory and repackaging the data for re-use by the pipeline. In one embodiment, the invention includes a unique index for every primitive that enters the graphics pipeline which aids in the scheduling of work items that reach the GPU, and accuracy in floating point and integer computations conform to IEEE standards. The geometry shader can also process information about adjacent primitives or pixels of a stream of graphics data being processed by the GPU.

Other advantages and features of the invention are described below.

BRIEF DESCRIPTION OF THE DRAWINGS

The systems and methods for an enhanced graphics pipeline, in accordance with the present invention, are further described with reference to the accompanying drawings in which:

FIG. 1A is a block diagram illustrating a prior art implementation of a graphics pipeline;

FIG. 1B is a block diagram illustrating a prior art implementation of multi-pass calculations;

DETAILED DESCRIPTION OF THE ILLUSTRATIVE EMBODIMENT

Overview

Figure 2A:
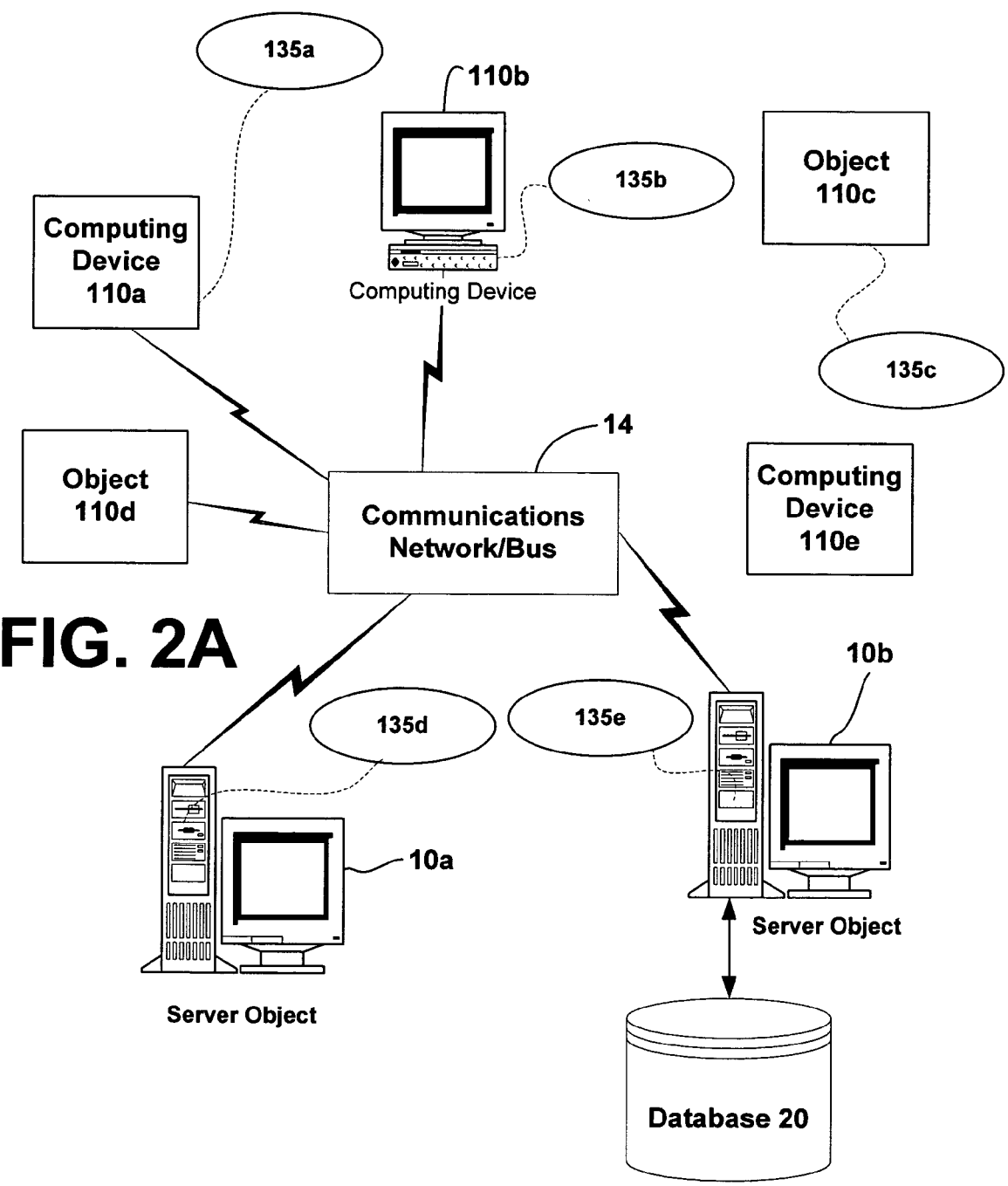
FIG. 2A is a block diagram representing an exemplary network environment having a variety of computing devices in which the present invention may be implemented.

As mentioned, the present invention enhances a graphics pipeline by adding greater functionality to present hardware by using a dynamically configurable common shader core for pixel shaders, vertex shaders, and geometry shaders. The common shader core allows simplified optimization as identical hardware units for the different shaders provide load balancing by reconfiguring, or disabling a shader as part of the pipeline when it is not needed, thus freeing up resources for stages that remain active. The invention introduces a geometry shader which can operate on primitives including points, lines, and triangles, and advantageously, new geometry can be generated inside the pipeline by a tesselator operating in one of a limited number of pre-set modes, or relatively arbitrarily by a programmable geometry shader. Another embodiment of the invention includes a stream output where primitive data can be streamed out to a buffer for re-use elsewhere in the pipeline, enabling the application of recursive programmatic algorithms inside the pipeline. Additional features include a unique index for every primitive passing through the graphics pipeline, and performing accurate integer and floating point calculations within the graphics pipeline.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for a non-limiting implementation of an enhanced graphics pipeline, in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. In a gaming environment, a graphics pipeline is particularly relevant to those computing devices operating in a network or distributed computing environment, and thus enhanced graphic pipeline techniques in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the graphics pipeline processes of the invention.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the graphics pipeline processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to an enhanced graphics pipeline according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the enhanced graphics pipeline in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 10a, 10b, etc. can be thought of as the server where server 10a, 10b, etc. maintains the data that is then replicated in the client computers 110a, 110b, etc., although any computer can be considered a client, a server, or both, depending on the circumstances. Any of these computing devices may be processing data or requesting services or tasks that may implicate the graphics programming techniques specific to an implementation of the enhanced graphics pipeline in the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the graphics programming techniques of the enhanced graphics pipeline may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to implement a graphics interface employing an enhanced graphics pipeline of the invention.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
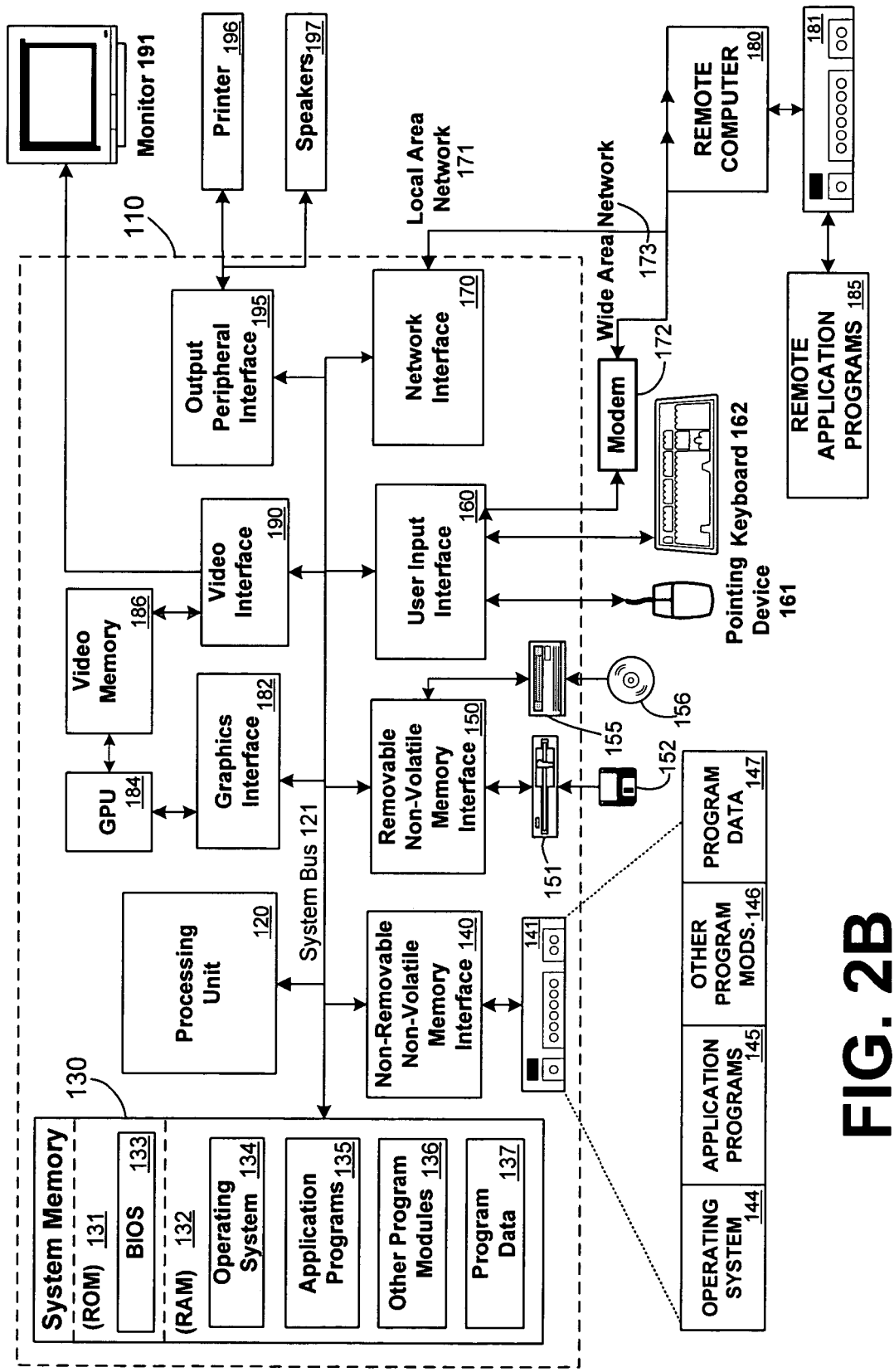
FIG. 2B is a block diagram representing an exemplary non-limiting computing device in which the present invention may be implemented.
Figure 2C:
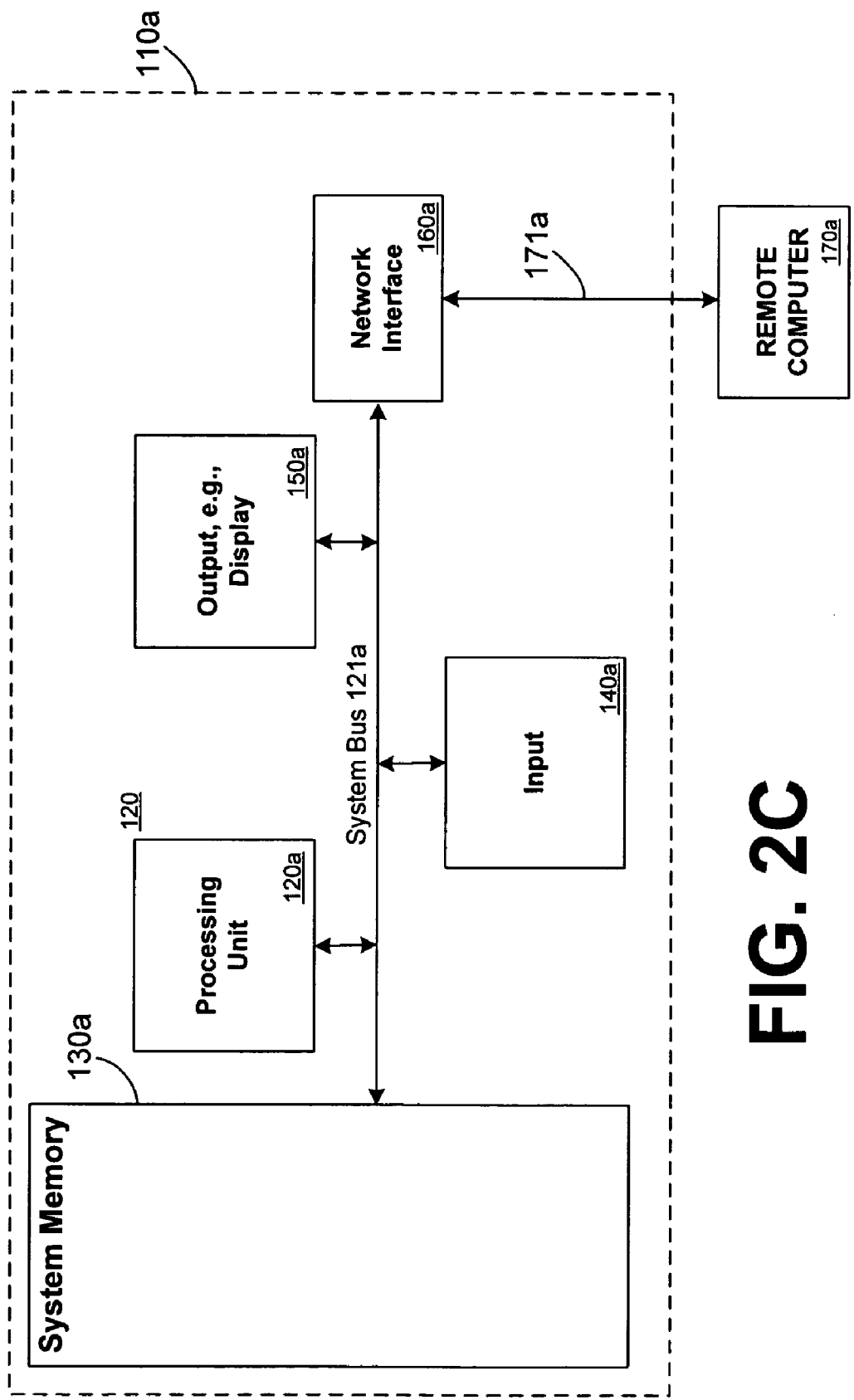
FIG. 2C is a block diagram representing an exemplary non-limiting networked remote computer in which the present invention may be implemented.

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that a GPU exists in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the graphics optimization technique in accordance with the invention.

Although not required, the invention can be implemented via an operating system, for use by a developer of services for a device or object, and/or included within application software that operates in connection with the graphics programming techniques for a graphics pipeline in the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as .NET code, and in other distributed computing frameworks as well.

Systems and Methods for Providing an Enhanced Graphics Pipeline

As described in the background and overview of the invention, the present invention improves upon the state of the graphics processing arts by introducing systems and methods for a graphics pipeline that optimize the use of resources, balance the workload in the graphics pipeline, allow access to calculated information with IEEE compliant integer or floating point values, and provide additional programmability. The invention is directed to geometry processing and programmable shaders. The enhanced graphics pipeline includes the introduction of a common core for all shaders, a stream output for computations that take place in the pipeline and a geometry shader which allows for programming primitives as well as the generation of new geometry.

Figure 3A:
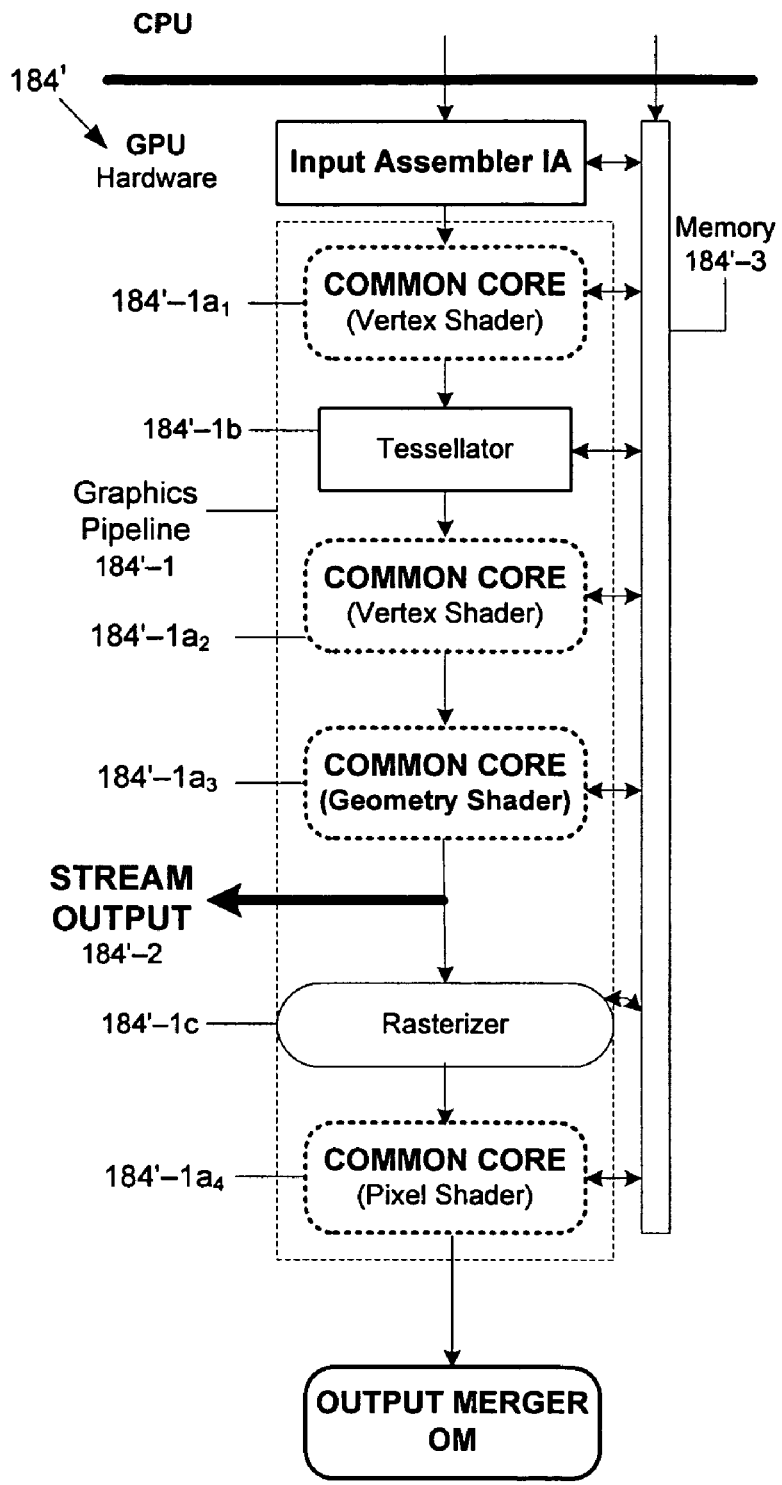
FIG. 3A is a block diagram representing an exemplary non-limiting implementation of the invented components in a graphics pipeline.

FIG. 3A shows an exemplary graphics subunit, such as a video card, that includes a graphics processing unit (GPU) $184'$ and an exemplary hardware configuration for the associated graphics pipeline $184'$-1. The exemplary non limiting embodiment of the graphics pipeline $184'$-1, as illustrated, includes a plurality of instances of a common core element $184'$-1$a$, such as vertex shaders $184'$-1$a_1$ and $184'$-1$a_2$, a geometry shader $184'$-1$a_3$ having an associated stream output $184'$-2 and a pixel shader $184'$-1$a_4$. Outside the GPU $184'$, this embodiment includes an input assembler that sends data to the first common core, $184'$-1$a_1$. As shown, the first common core of the embodiment is configured as a vertex shader. The data is then sent to a tessellator $184'$-1$b$, which performs tessellation on the data. Following the tessellator $184'$-1$b$, there is another common core in the pipeline, which can be used to perform post tessellation vertex shading on the data. The tessellator steps, in this embodiment, are optional. The second common core is followed by a third common core that is configured as a geometry shader, $184'$-1$a_3$. The geometry shader takes one primitive and outputs either zero, one or multiple primitives. The output primitives can contain more data than either a vertex or pixel shader. After the third common core, there can be a stream output, $184'$-2, where primitives that reach this point may be streamed out to one or more output buffers. For purposes of providing a sample, the stream output is included in FIG. 3A. The next component of the pipeline is a rasterizer $184'$-1$c$, whose regular functions may include clipping, perspective divides, viewport or scissor selection and implementation. Following the rasterizer is a fourth common core, $184'$-1$a_4$, and it functions as a pixel shader where it takes one pixel and outputs the pixel at a position. An output merger OM serves to read and write memory at the end of the pipeline, and the output(s) of the pixel shader go through the output merger OM stage, and then out to memory via read/modify/write operations (a.k.a., "blending"). While the data can then be displayed by a monitor, one may not necessarily be rendering the data, i.e., host calls can retrieve the data, and the data can further be accessed for use inside the pipeline itself.

Further embodiments of the invention as reflected by the common core, the geometry shader, the stream output and ability to generate new geometry inside the pipeline of the invention are described in more detail below.

Common Shader Core for Shaders in the Pipeline

As mentioned in the background, a resource contention issue sometimes occurs due to the demands of different components of the graphics pipeline where specific components are required for a specific task, which can lead to a bottleneck in that area of the pipeline. Current graphics pipelines require optimization by the programmer in order to use the resources most effectively in the pipeline. Even with the best optimization schemes, however, prior art hardware itself is fixed, and thus there are times when the pixel shader or vertex shader remain idle, for instance, when the computations involve heavy matrix manipulation and the vertex shader is unable to compute such values fast enough. Thus, the pipeline may have bottlenecks due to excessive processing by the vertex shaders while the pixel shaders sits idle, or vice versa. In accordance with the invention, since shaders are able to function as one another, where a pixel shader can be reconfigured to function as a vertex shader, the underlying resources of the graphics chip can be optimized for the tasks being asked of the graphics chip. Moreover, as mentioned, the invention introduces a new class of shader referred to herein as a geometry shader, that provides another specialized set of processing capabilities. The common core provided by the invention can thus be configured as any of a vertex shader, a pixel shader and a geometry shader.

In an exemplary non limiting embodiment, the GPU contains a farm of units $184'$-1$a$, which can thus be scheduled to different stages on demand. This load balancing means programmers do not have to worry about utilizing every stage. Any stage may be dynamically enabled or disabled, and configured or reconfigured, thereby freeing and respecializing resources for stages that are active. The common core is able to perform the vertex shader stage, the geometry shader stage and the pixel shader stage, depending on its configuration.

Figure 4A:
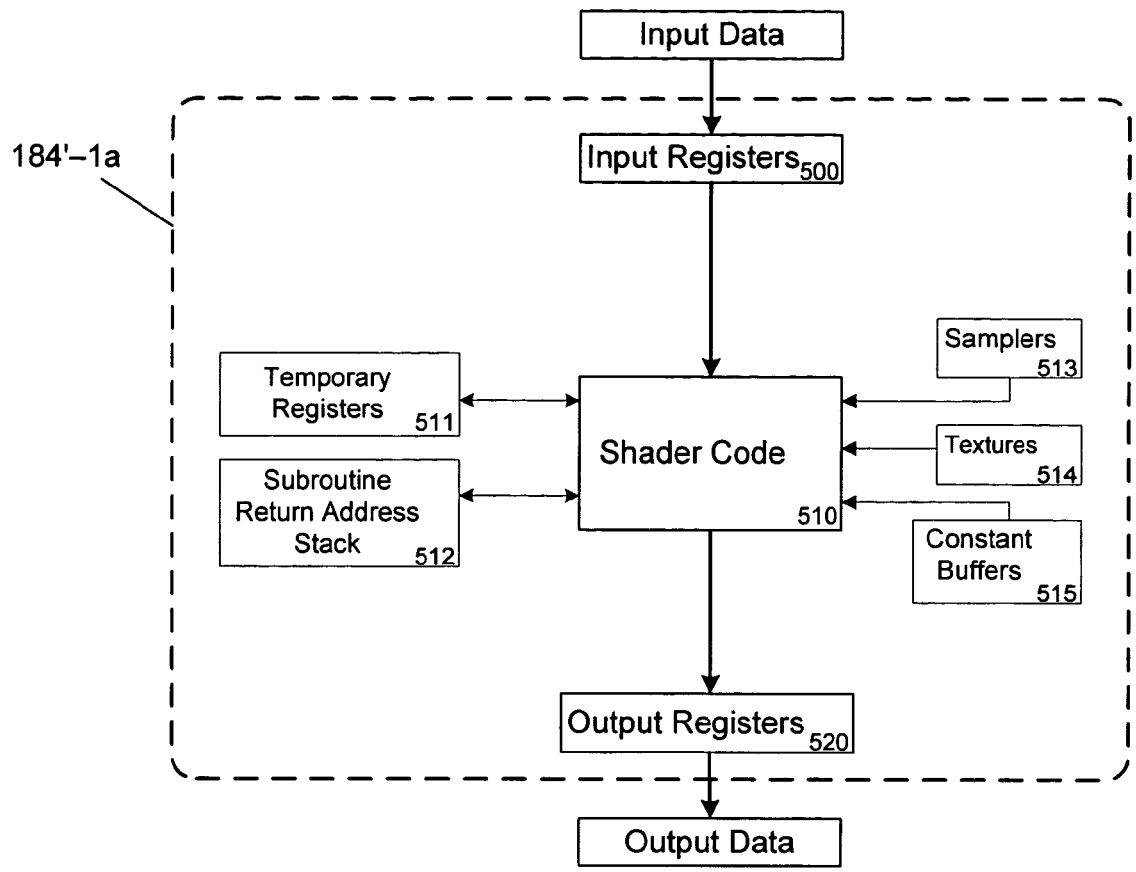
FIG. 4A is a block diagram representing the hardware and software components of the common core.

FIG. 4A shows an exemplary, non-limiting embodiment of an internal common core, 184'-1a. The input data is supplied by a previous stage, which may be from anywhere in the pipeline. The input registers 500 may be a dynamically indexable array or a two dimensional (2D) array depending upon what stage the common core is to perform. The data is sent to the shader code 510 and the code handles all vector floating point and integer arithmetic, and memory fetch or sample operations.

The shader code receives information from the samplers 513, the textures 514 and the constant buffers 515. The samplers 513 define how to sample textures. However, memory can also be read without filtering and the sampler is not necessary in every embodiment. Because sampler objects are statically created, it enables the hardware to maintain references of multiple samplers in the flight of the pipeline without having to track changes or flush the pipeline (because the sampler objects maintain their definitions and are not modified). The textures 514 work with the shader code to provide texture sampling. In this particular embodiment, the only permitted resources are those containing a single element format per texel. The shader code receives constants from the constant buffers 515. In this embodiment, the constant buffers would function like one dimensional (1D) textures which are optimized for lower latency access and more frequent update. The shader code 500 also has two way communication with the temporary registers 511 and the subroutine return address stack 512. The temporary registers 511 serve as temporary storage. In an exemplary, non limiting embodiment, the registers can hold any non-indexable or indexable arrays of any size and quantity that are needed up to the limit of the temporary storage. The subroutine return address stack 512, in this particular, non limiting exemplary embodiment, is a fixed height. Furthermore, the stack is hidden from direct shader access and transparently stores return addresses only. It also permits the definition of recursive algorithms.

After the code has passed through the shader code 510, the data goes to output registers 520. The output registers 520, in this exemplary non limiting embodiment, are made of a dynamically indexable array of four vector outputs. Furthermore, some stages may have additional specialized outputs. The data is then output to the next shader stage, as a stream output or to a rendering stage depending on the pipeline.

The data structures listed can be changed from a 1D array to a 2D array or a list. All data structures may change depending on the size and storing capabilities of the GPU. Within the GPU, changes to the storage limits and fixed heights may occur due to dynamic allocation, and application of compression algorithms to information to conserve space. The samplers and constant buffers may behave like the textures, however as resources change, the definitions of these components may be modified. If textures are redefined, both samplers and constant buffers can change and are not limited to just the texture functions. Furthermore, all the data structures can implement new optimization algorithms for speed and utility purposes. The various embodiments described herein are mere examples of graphics pipeline using common cores, which can be dynamically configured to provide functionality of a vertex shader, a pixel shader and a geometry shader.

Geometry Shader to Operate on Primitives

Today, as graphics programmers develop graphics applications via a set of available graphics APIs, the programmer generally indicates a set of vertices to be operated upon by a set of algorithmic elements. Having specified the information, the data is sent into the graphics pipeline, and each vertex is streamed through a vertex shader and a pixel shader, as illustrated in FIG. 1A. Although any data that fits the input structure for the vertex and pixel shaders may be specified, vertex shaders are generally suited and used for operation upon vertices and pixel shaders are generally suited and used for operation upon pixels.

In this regard, a geometry shader in accordance with the invention is a new type of shader for a GPU in a graphics subsystem that is capable of taking different types of "primitive" input including any of a vertex, a line or a triangle, whereas prior art shaders (namely vertex shaders) are limited to being able to input, operate on and output vertices. In distinction, in addition to operation on a stream of vertices, the geometry shader of the invention can operate on primitives that define lines (sets of two vertices) and triangles (sets of three triangles), receiving such primitives as input inside the pipeline and outputting primitives inside the pipeline for further operation in accordance with the graphics architecture of the invention.

One further aspect of the primitive processing in accordance with the invention is that the geometry shader enables operations on the entire primitive not just by itself, but also in the context of some additional nearby vertices. One line segment in a polyline, for example, may be processed with the ability to read the vertices before and after that segment. Although the mechanism is general (graphics data need not be "graphics" data, it can be any data defined for processing by the GPU), a frequent use for this capability to process adjacent vertices of a primitive is that the geometry shader is capable of taking information about neighboring points in 3-D geometric space into account in current calculations.

Figure 4B:
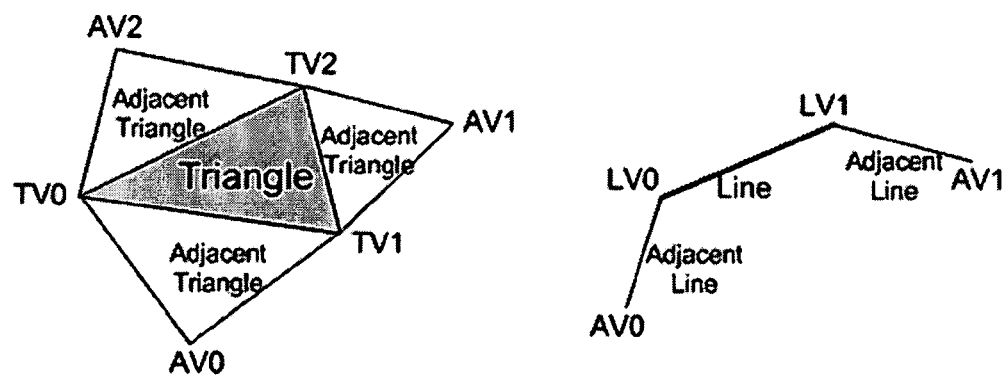
FIG. 4B is a diagram illustrating exemplary functionality of the geometry shader which can receive and output multiple vertices from a single topology.

In FIG. 4B, there is an embodiment of the functionality of the geometry shader where TV0, TV1, TV2, LV0, and LV1 are input data. The output data may include additional points which are indicated with the prefix AV. A geometry shader may thus take in one primitive, and output multiple primitives, optionally processing adjacent primitives, such as adjacent vertices. Some examples of the output include topologies like a triangle strip, a line strip or a point list. In this exemplary non-limiting embodiment, the output from a geometry shader goes to either a rasterizer for rendering and/or to the buffer for stream output.

Figure 4C:
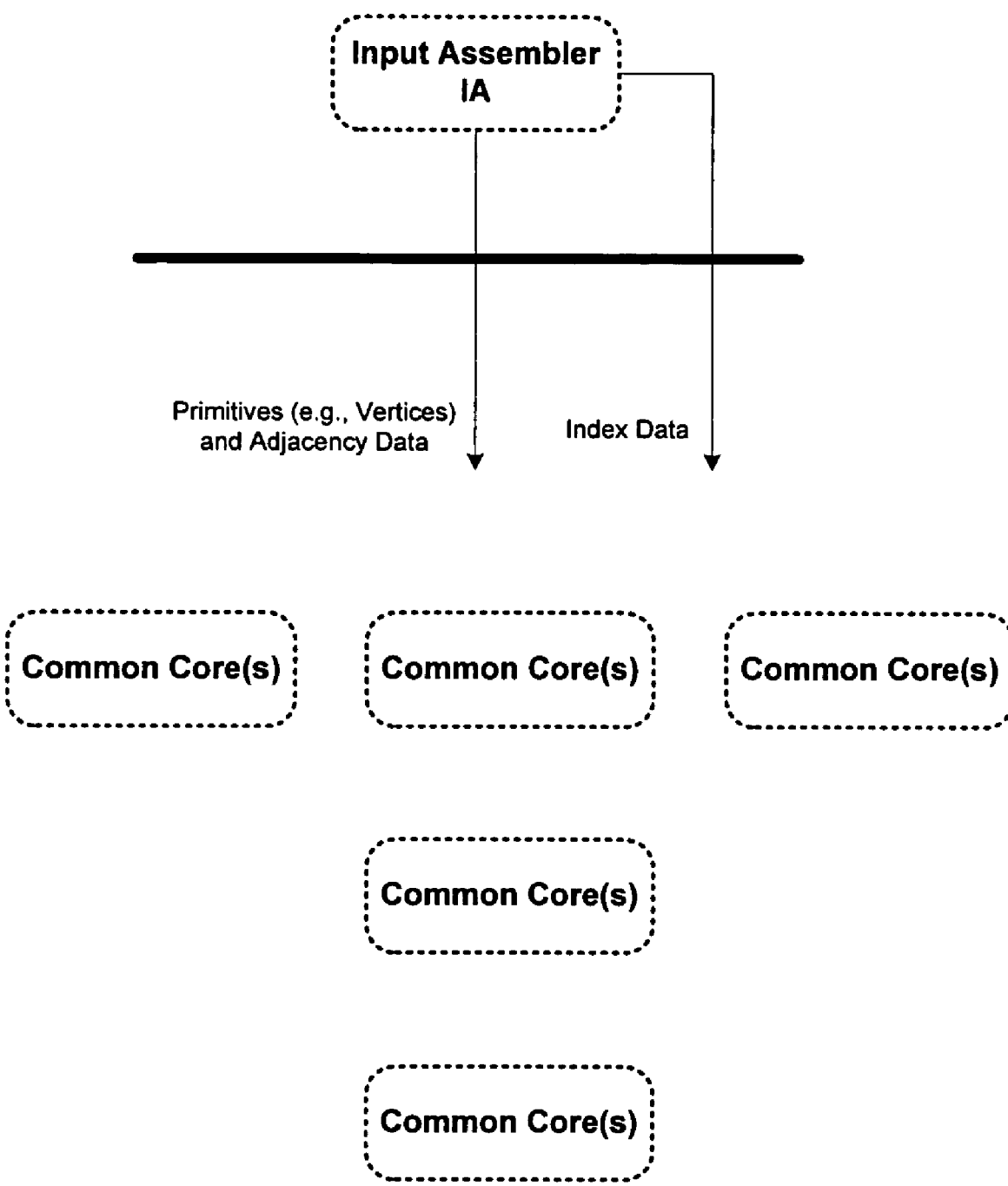
FIG. 4C is a diagram illustrating the generation of per primitive or per pixel index values for graphics streams processed according to the graphics pipeline in accordance with the invention.

The concept is further illustrated in FIG. 4C. In accordance with the invention, optionally, the data of the graphics data to be processed by the graphics pipeline may also be assigned an index. Previously, to index data, separate memory would have to have been pre-populated with index information for use with data being passed through the pipeline. In addition to synchronization issues with this prior art approach (synchronizing the indexes and the graphics data being processed), there are clear speed implications too. While generating the index information is fast, writing the index information to video memory, and reading from video memory to be used with the streaming graphics data is expensive in terms of time.

Thus, with the invention, the input assembler IA outputs the graphics data to be operated by the common core(s), along with any optional adjacency information (information about neighbors in the stream of primitives or data) and a corresponding stream of indexes can be generated for each element (primitive, data point, pixel value, etc.) represented by the graphics data. In one embodiment, indexes start at zero and increase by one with each new element of data, though any index value can be used as a start index value. Moreover, for some application, it may not even be useful to generate ordered indexes, and accordingly, in the generic sense, the invention generates unique identification (ID) values per graphics data element, which may or need not be ordered.

The ability to index has broad implications, and the range of uses are numerous. For instance, for geometry instancing, one might have a first area of memory with graphics data that defines a tree and another table that describes position for trees. Based on a count or index processed by the pipeline, the GPU can fetch portions of video memory to place variations of the tree at the positions defined by the table. The invention enables the use of an index value as part of a video memory addressing scheme while processing data, i.e., the index may signify where and when to retrieve (and/or write to) portions of video memory for processing. As another example, it may be useful to apply a different algorithm to every fourth triangle of a stream of triangles and to perform the algorithm twice on every eighth triangle of the stream. The ability to index the primitives enables precisely this capability. The programs downloaded to the shader can thus programmatically use the index values associated with the graphics data while retrieving or writing to video memory, and also while processing graphics data.

Stream Output of Memory Before Frame Buffer Rasterization

As discussed in the background, with today's graphics pipelines, reading from the video memory used by a GPU to see the outcome of computation being performed in the pipeline is next to impossible. Having the knowledge of how to locate and extract data on the fly as it is being processed by a GPU's procedural shaders, and then actually extracting the data from video memory is too difficult a task in today's architectures. FIG. 1B shows how a programmer could go about retrieving the data from the output of the graphics pipeline, namely the frame buffer, and implicate host resources in order to send the data back into the pipeline for further processing. As explained, this task requires the programmer to either get the data from the frame buffer or the display. Generally, if further processing on data is necessary after passing through the pipeline, the programmer waits for the information to be received by the frame buffer and invokes the resources of the CPU to achieve the further processing.

In consideration of the shortcomings of today's graphics pipelines with respect to the recirculation of graphics data inside the pipeline, the invention allows programmers to "tap" into the pipeline while the data is inside the pipeline, wherein a tap can be turned on and off. When turned on, the pipeline includes an output stream of data that can either be read from memory for retrieval by the host or other operation, or recirculated into the pipeline to perform recursive or looping functionality. Furthermore, if necessary, the information can be streamed out while the same data goes to the rasterizer, thus not slowing down the rendering of data, or enabling the display of the image as it undergoes a transformation based on recursive algorithmic elements operating on the data.

Figure 3B:
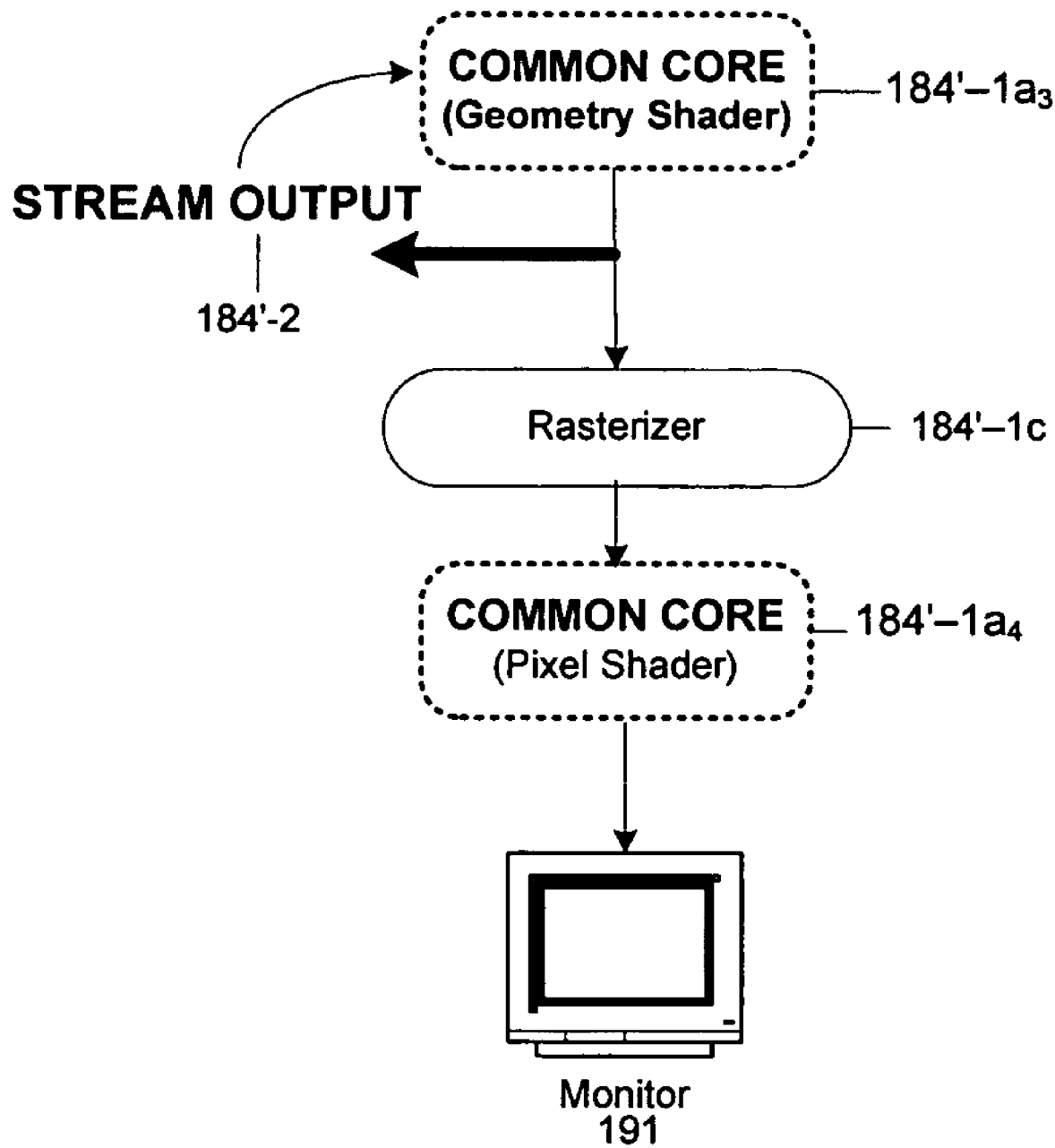
FIG. 3B is a block diagram representing an exemplary non-limiting implementation of multi-pass calculation using stream output functionality.

FIG. 3B shows an embodiment of a stream output in accordance with the invention. In this embodiment, the above-described common core, behaving as a geometry shader 184-1$a_3$, is performing computations or manipulations on the data and there is a stream output, 184'-2, whereby, when turned on, the data is written to a buffer in accordance with the invention. In the figure, the stream output is shown recirculating the data to the shader itself. This type of recirculation is useful for examples where a programmer wishes to perform multi-pass operations on the given data. However, as specified by the program downloaded to the GPU, there are other ways of using the stream output to recirculate data as well. Another way to recirculate data is to send it through the pipeline again inputting the data to the input assembler again. The stream output capabilities of the invention are optional, and an application may merely allow the pipeline to send the data through without reading the data to a stream output buffer. Furthermore, the stream output buffer is one example of the type of memory that can be used to store the streamed data. There may be times when different types of memory may be used for such functionality, like cache memory in a microprocessor.

Lastly, memory is limited in space and therefore the stream output tracks the amount of data dependent upon the buffer size. When the memory storage space is full, in one exemplary embodiment, the shader continues its calculations for all data, while tallying the number of bytes needed to store all of the output data. This can be useful when it is unpredictable how much data will be produced by the calculations. The stream output may be used for graphics, but is not limited to only graphics. Although this is an enhancement of the graphics pipeline, the GPU can be used for mathematical calculations and can use the processing power of both the GPU and CPU. The uses of the stream output cover a wide range, as the stream output does not stop the rasterization functions of the graphics pipeline, and merely amplifies the power of the pipeline by providing more programmatic power to the developer in terms of the flexibility of specialized programs downloaded to the GPU. As mentioned, a very useful result of being able to tap into the output of a common core in accordance with the invention is that the data may be recirculated to other parts of the pipeline programmatically, i.e., the programmer can download a program to the GPU which performs recursive operations on the data (recircling data through the same algorithms recursively) or otherwise loop through the data a pre-fixed number of times.

Generation of Geometry Inside the Pipeline

As mentioned, today, as graphics programmers develop graphics applications via a set of available graphics APIs, the programmer generally indicates a set of vertices to be operated upon by a set of algorithmic elements. Having specified the information, the data is sent into the graphics pipeline, and each vertex is streamed through a fixed set of GPU subunits, such as a tesselator, vertex shader(s) and pixel shader(s), as illustrated in FIG. 1A. Although any data that fits the input structure for the vertex and pixel shaders may be specified, vertex shaders are generally suited and used for operation upon vertices and pixel shaders are generally suited and used for operation upon pixels. However, other than the fixed stage tessellation which can generate geometry based on pre-defined control points prior to procedural shading according to pre-determined algorithms, there is nowhere in the pipeline today that can be used to generate new vertices, or geometry, for further processing.

Moreover, the tesselator of the invention may be used after the use of one or more, procedural shading stages to receive a set of control points generated inside the pipeline, and operate programmatically, depending on the programs that configure the pipeline downloaded by the graphics APIs, to generate an arbitrary new number of geometry points. This is helpful, for instance, where it is desirable to perform coarse operations on a coarse mesh, but then to refine the mesh for additional operations requiring a more realistic model of the shapes. Previously, tesselator generation of geometry was limited to the beginning stage of a pipeline, and limited to pre-fixed operations on the pre-specified control point inputs. In consideration of such limitations, the invention enables common core(s) at the beginning of the pipeline to arbitrarily generate control points inside the pipeline (upstream from the tesselator), to output those control points to a tesselator, which generate additional geometry to be operated downstream as output from the tesselator.

As mentioned, the geometry shader of the invention may also be used to generate new geometry in a more general and programmable manner, as differentiated from a tesselator—which is fixed function (not programmable) but generates arbitrary amounts of data (n×n mesh, no limit on n) versus the geometry shader, which is programmable, but is constrained in how much new geometry it can create.

For some exemplary non-limiting scenarios, the geometry shader of the invention assists a programmer by creating output vertices using a topology rather than a single vertex. Some examples of algorithms include point sprite tessellation, wide line tessellation, fin generation, shadow volume generation, and single pass rendering to multiple texture cube faces. To perform point sprite tessellation, the shader would take a single vertex and generate four vertices, or two output triangles representing four corners of a quadrilateral, while performing wide line tessellation, the shader receives two line vertices, like LV0 and LV1 in FIG. 4B, and generates four vertices for a quadrilateral representing a widened line. Additionally, the geometry shader may utilize adjacent line vertices, AV0 and AV1, to perform mitering on the line end points.

The geometry shader can also be used to generate fur or fins, this is not limited to fur or fin generation, but encompasses any additional vertices added in a third direction of a single topology. Examples include hair, scales, grass, etc., where primitives describing a geometry are fed to the geometry shader, and the geometry shader grows the geometry arbitrarily to supplement the shape. Thus, with hair, for instance, based on triangles input to a geometry shader, the geometry shader can add a few vertices that represent hair at each vertex. Advantageously, because a stream of triangles to the geometry shader includes information about the neighbors of a vertex, the proximity and properties (color, depth, etc.) of the geometry of the vertex's neighbors can be taken into account during processing.

While currently, geometry shaders of the invention are limited to being able to generate a maximum number of new arbitrary geometry, as specified by the program downloaded to the geometry shader by the graphics APIs, when combined with the recursive capabilities of the invention enabled by the stream output defined in more detail below, the invention enables arbitrary generation of unlimited geometry. For instance, in the case where a geometry shader may only create Another exemplary non limiting use of the geometry shader includes shadow volume generation where the adjacency information is used to decide whether to extrude. Furthermore, an application may want to generate some geometry, like a fin or fur and extrude shadow volumes out of that. In such cases, multi-pass functionality of the geometry shader would be employed using the ability output a data stream and circulate it back through the use of the stream output.

Figure 5:
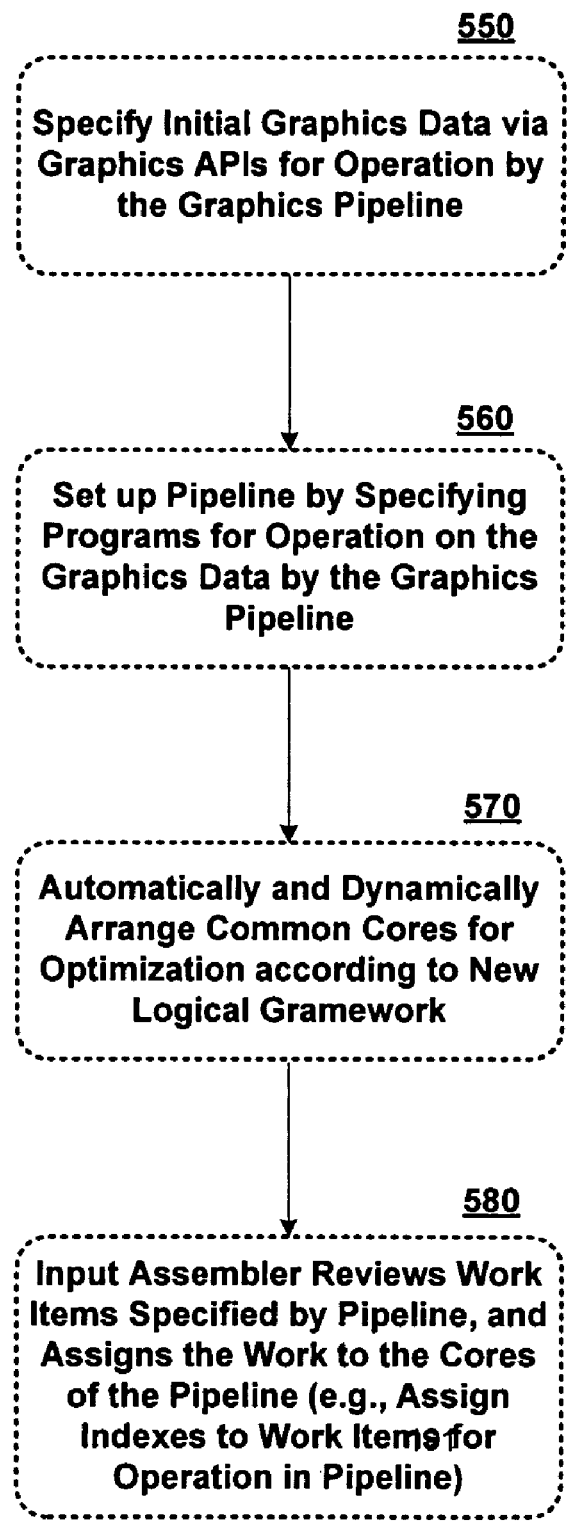
FIG. 5 illustrates an exemplary non-limiting flow diagram for utilizing the enhanced abilities of the graphics pipeline of the present invention.

FIG. 5 illustrates an exemplary non-limiting flow diagram to show how an application would make graphics calls to achieve the above-described benefits of the architecture of the invention. At 550, the graphics data to be operated upon is specified. As mentioned, less graphics data need be specified at the front end than in the past because arbitrary new amounts of geometry can be generated inside the pipeline, even recursively, in accordance with the invention. At 560, programs for execution by the GPU can be downloaded to the GPU to define the algorithmic elements for operation by the GPU. At 570, the input assembler (See, e.g., FIG. 3A) automatically takes the graphics data specified at 550 and the programs specified at 560 and optimizes the arrangement of common cores in accordance with the invention. Thus, where vertex or pixel computation is intensive as part of the specification of programmable elements delivered to the GPU at 560 and the graphics data specified at 550, the invention may configure the pipeline cores to include a lot of vertex shaders or pixel shaders, respectively. On the other hand, where complex operations are desired on triangles, the input assembler may reconfigure the cores to include a plurality of geometry shaders. Additionally, such options as the stream output feature and pre and post tesselation procedural shading stages can be added. At 580, the input assembler reviews the work items specified for processing by the graphics pipeline, and assigns the work to the cores. At this stage, index information may be added to primitives that pass through the pipeline, e.g., an index per primitive or an index per pixel.

In essence, one can quickly see the benefits of highly specialized and fast hardware that can be dynamically customized for the job it is requested to perform. This includes being able to specify recursive programs via stream output, being able to dynamically reconfigure the cores, being able to quickly operate on vertices while simultaneously taking input relating to the neighbors of the vertices, being able to generate new geometry arbitrarily anywhere in the pipeline (pre-tesselation generation of geometry, tesselator generation of geometry and post-tesselation generation of geometry). Accordingly, the advantages of the present invention are almost unlimited from the standpoint of the developer, who becomes closer to being limited only by imagination by what may be accomplished on graphics data in accordance with the invention.

The enhanced graphics pipeline of the invention thus includes a common core that is dynamically configurable to allocate pixel shaders, geometry shaders and vertex shaders in a manner that is best suited for the tasks being requested of the pipeline. The invention also includes a new procedural shader termed a geometry shader capable of operating on streams of any of points, lines and triangles. Moreover, the invention includes the ability to generate new geometry inside the pipeline, by the tesselator or by a geometry shader. The invention also includes a stream output, which may be tapped into inside the pipeline, prior to the data reaching the frame buffer for rasterization, enabling programmatic recursive and looping algorithms on graphics data. Also, the invention includes the ability to index every primitive that enters or is created in the graphics pipeline. The graphics pipeline can also perform all integer and floating point calculations according to IEEE standards.

There are multiple ways of implementing the present invention, e.g., an appropriate API, tool kit, driver code, operating system, control, standalone or downloadable software object, etc. which enables applications and services to use the systems and methods of the enhanced graphics pipeline invention. The invention contemplates the use of the invention from the standpoint of an API (or other software object), as well as from a software or hardware object that receives any of the aforementioned techniques, including techniques of the common core, the geometry shader or the stream output in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to employ a GPU with an enhanced graphics pipeline. For instance, the algorithm(s)

and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the enhanced graphics pipeline techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of a graphics pipeline, the invention is not so limited, but rather may be implemented to provide a second processing unit. For instance, if the programmer wants to render a display to the screen and process the computational mathematics while performing another function using the CPU, the processing units may need to be utilized to their fullest, whether or not the graphical display is included in the final output. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for processing at least one stream of graphics data by a graphics processing unit (GPU) on behalf of a host processor, comprising:

receiving at least one input stream of graphics data by at least one input of a programmable subunit of the GPU;

based on programmatic instructions downloaded to the programmable subunit, performing computation on the at least one input stream of graphics data to generate at least one output stream of graphics data; and based on at least one instruction of said programmatic instructions, outputting said at least one output stream of graphics data to a stream output portion of video memory via a stream output of said programmable subunit such that said at least one output stream of graphics data is accessible by host processor read operations, wherein said stream output portion of video memory is different than a frame buffer portion of video memory used for rasterization, and said programmable subunit generates a new geometry for said stream output portion of video memory, and wherein said programmable subunit is initially configured as either a vertex shader, a pixel shader or a geometry shader, and wherein said programmable subunit is capable of being dynamically reconfigured from a vertex shader to function as a pixel shader or a geometry shader, and is capable of being dynamically reconfigured from a pixel shader to function as a vertex shader or a geometry shader, and is capable of being dynamically reconfigured from a geometry shader to function as a vertex shader or a pixel shader; and dynamically reconfiguring the programmable subunit from the initial configuration of shader type to function as another shader type for load balancing among a plurality of other programmable subunits.

2. The method of claim 1, wherein said at least one instruction includes an instruction that enables the stream output of the programmable subunit.

3. The method of claim 1, further including, based on at least one instruction of said programmatic instructions, inputting said at least one output stream of graphics data stored in said stream output portion of video memory to an input of at least one other computational subunit of the GPU.

4. The method of claim 1, further including, based on at least one instruction of said programmatic instructions, re-inputting said at least one output stream of graphics data stored from said stream output portion of video memory to the at least one input of the programmable computational subunit of the GPU.

5. The method of claim 4, wherein said at least one output stream of graphics data is re-input according to said re-inputting based on said at least one instruction of said programmatic instructions without further instruction from said host processor.

6. The method of claim 1, wherein said receiving includes receiving at least one input stream of graphics primitives data.

7. The method of claim 6, wherein the at least one input stream of graphics primitives data includes any of a stream of vertices, a stream of sets of two related vertices and a stream of sets of three related vertices.

8. The method of claim 6, wherein said receiving includes receiving at least one input stream of graphics primitives data and receiving a unique index for each primitive represented by said at least one input stream of graphics primitives data.

9. The method of claim 1, wherein said performing includes performing floating point computation on the at least one input stream of graphics data with accuracy that conforms to IEEE standards.

10. The method of claim 1, further including receiving said programmatic instructions via a graphics application programming interface in cooperation with the host processor.

11. A method for processing at least one stream of graphics data by a graphics processing unit (GPU) on behalf of a host processor, comprising:
inputting at least one input stream of graphics data to a first computational subunit of the GPU;
performing computation on the at least one input stream of graphics data by said first computational subunit to generate at least one output stream of graphics data; and
prior to inputting said at least one output stream of graphics data to a second computational subunit of the GPU, outputting said at least one output stream of graphics data to a processor-readable portion of graphics memory;
wherein said second computational subunit generates a new geometry for said output stream of graphics data, and
wherein said first and second subunits are initially individually configured as either a vertex shader, a pixel shader or a geometry shader, and wherein said first and second computation subunits are capable of being dynamically reconfigured from a vertex shader to function as a pixel shader or a geometry shader, and are capable of being dynamically reconfigured from a pixel shader to function as a vertex shader or a geometry shader, and are capable of being dynamically reconfigured from a geometry shader to function as a vertex shader or a pixel shader;
dynamically reconfiguring the first and second subunits from the initial configuration of shader type to each function as another shader type for load balancing among a plurality of other subunits.

12. The method of claim 11, further including inputting said at least one output stream of graphics data to the second computational subunit of the GPU.

13. The method of claim 11, further including inputting said at least one output stream of graphics data stored in said processor-readable portion of graphics memory to a third computational subunit of the GPU.

14. The method of claim 11, further including re-inputting said at least one output stream of graphics data stored in said processor-readable portion of graphics memory to the first computational subunit of the GPU.

15. The method of claim 11, wherein said inputting includes inputting at least one input stream of graphics primitives data and inputting a unique index for each primitive represented by said at least one input stream of graphics primitives data.

16. The method of claim 11, wherein said performing includes performing floating point computation on the at least one input stream of graphics data with accuracy that conforms to IEEE standards.

17. The method of claim 11, wherein said performing computation includes generating at least one output stream of graphics data and generating additional geometry in said at least one output stream of graphics data.

18. The method of claim 11, further including receiving programmatic instructions via a graphics application programming interface in cooperation with the host processor to program said first and second computational subunits.

19. A method for processing at least one stream of graphics data by a graphics processing unit (GPU) on behalf of a host processor, comprising:
receiving at least one input stream of graphics data by a first computational subunit of the GPU;
performing computation on the at least one input stream of graphics data by said first computational subunit to generate at least one output stream of graphics data;
if a stream output of the first computation subunit is enabled, outputting said at least one output stream of graphics data to a processor-readable portion of graphics memory; and
outputting said at least one output stream of graphics date to a second computational subunit of the GPU for further processing;
wherein said first computational subunit generates a new geometry for said output stream of graphics data, and
wherein said first and second subunits are initially individually configured as either a vertex shader, a pixel shader or a geometry shader, and wherein said first and second computation subunits are capable of being dynamically reconfigured from a vertex shader to function as a pixel shader or a geometry shader, and are capable of being dynamically reconfigured from a pixel shader to function as a vertex shader or a geometry shader, and are capable of being dynamically reconfigured from a geometry shader to function as a vertex shader or a pixel shader; and
dynamically reconfiguring the first and second subunits from the initial configuration of shader type to each function as another shader type for load balancing among a plurality of other subunits.

20. The method of claim 19, further including receiving said at least one output stream of graphics data by the second computational subunit of the GPU.

21. The method of claim 19, further including receiving said at least one output stream of graphics data stored in said processor-readable portion of graphics memory by a third computational subunit of the GPU.

22. The method of claim 19, further including receiving said at least one output stream of graphics data stored in said processor-readable portion of graphics memory by the first computational subunit of the GPU again for further computation.

23. The method of claim 19, wherein said inputting includes inputting at least one input stream of graphics primitives data.

24. The method of claim 23, wherein the at least one input stream of graphics primitives data includes any of a stream of vertices, a stream of sets of two related vertices and a stream of sets of three related vertices.

25. The method of claim 24, wherein said receiving includes receiving at least one input stream of graphics primitives data and receiving a unique index for each primitive represented by said at least one input stream of graphics primitives data.

26. The method of claim 19, wherein said performing includes performing floating point computation on the at least one input stream of graphics data with accuracy that conforms to IEEE standards.

27. The method of claim 19, wherein said performing computation includes generating at least one output stream of graphics data and generating additional geometry to be included in said at least one output stream of graphics data.

28. The method of claim 19, further including receiving programmatic instructions via a graphics application programming interface in cooperation with the host processor to program said first and second computational subunits.

29. A computational subunit of a graphics processing unit for performing shading on at least one stream of graphics data, comprising:
an input component that receives at least one input stream of graphics data as input to the computational subunit;
a processing unit for processing the at least one input stream of graphics data to generate at least one output stream of graphics data;
an optional stream output for outputting said at least one output stream of graphics data to a processor-readable portion of graphics memory for recirculation in the graphics processing unit for further processing prior to being received by a frame buffer memory portion used for rasterization;
wherein said computational subunit generates a new geometry for said output stream of graphics data, and
wherein said computational subunit is initially configured as either a vertex shader, a pixel shader or a geometry shader, and wherein said computational subunit is capable of being dynamically reconfigured from a vertex shader to function as a pixel shader or a geometry shader, and is capable of being dynamically reconfigured from a pixel shader to function as a vertex shader or a geometry shader, and is capable of being dynamically reconfigured from a geometry shader to function as a vertex shader or a pixel shader; and
dynamically reconfiguring the computational subunit from the initial configuration of shader type to function as another shader type for load balancing among a plurality of other programmable subunits.

30. The computational subunit of claim 29, wherein said at least one output stream of graphics data is output to said processor-readable portion of graphics memory for recirculation to the input of the computational subunit.

31. The computational subunit of claim 29, wherein said input component receives at least one input stream of graphics primitives data.

32. The computational subunit of claim 31, wherein the at least one input stream of graphics primitives data includes any of a stream of vertices, a stream of sets of two related vertices and a stream of sets of three related vertices.

33. The computational subunit of claim 29, wherein said processing unit generates additional geometry for inclusion in said at least one output stream of graphics data.

34. A graphics processing unit for performing shading on at least one stream of graphics data, comprising:
a first computational subunit having:
an input component that receives at least one input stream of graphics data as input to the first computational subunit;
a processing unit for processing the at least one input stream of graphics data to generate at least one output stream of graphics data;
an optional stream output for outputting said at least one output stream of graphics data to a processor-readable portion of graphics memory for recirculation in the graphics processing unit for further processing prior to inputting said at least one output stream of graphics data to a second computational subunit of the GPU;
wherein said computational subunit generates a new geometry for said output stream of graphics data, and
wherein said computational subunit is initially configured as either a vertex shader, a pixel shader or a geometry shader, and wherein said computational subunit is capable of being dynamically reconfigured from a vertex shader to function as a pixel shader or a geometry shader, and is capable of being dynamically reconfigured from a pixel shader to function as a vertex shader or a geometry shader, and is capable of being dynamically reconfigured from a geometry shader to function as a vertex shader or a pixel shader, and
wherein said computational subunit is dynamically reconfigured from the initial configuration of shader type to function as another shader type for load balancing among a plurality of other computational subunits.

35. The graphics processing unit of claim 34, wherein said at least one output stream of graphics data is output to said processor-readable portion of graphics memory for recirculation to the input of the first computational subunit.

36. The graphics processing unit of claim 34, wherein said input component receives at least one input stream of graphics primitives data.

37. The graphics processing unit of claim 36, wherein the at least one input stream of graphics primitives data includes any of a stream of vertices, a stream of sets of two related vertices and a stream of sets of three related vertices.

38. The graphics processing unit of claim 34, wherein said processing unit generates additional geometry for inclusion in said at least one output stream of graphics data.

39. A graphics processing unit for performing shading on at least one stream of graphics data, comprising:
a first computational subunit having:
an input component that receives at least one input stream of graphics data as input to the first computational subunit;
a processing unit for processing the at least one input stream of graphics data to generate at least one output stream of graphics data;
an optional stream output for outputting said at least one output stream of graphics data to a processor-readable portion of graphics memory; and
an output component for outputting the at least one output stream of graphics data to a second computation subunit of the GPU for further processing, wherein instructions received by the processing unit instruct said first computational subunit to output said at least one output stream of graphics data via at least one of (A) said optional stream output and (B) said output component;

wherein said computational subunit generates a new geometry for said output stream of graphics data, and wherein said computational subunit is initially configured as either a vertex shader, a pixel shader or a geometry shader, and wherein said computational subunit is capable of being dynamically reconfigured from a vertex shader to function as a pixel shader or a geometry shader, and is capable of being dynamically reconfigured from a pixel shader to function as a vertex shader or a geometry shader, and is capable of being dynamically reconfigured from a geometry shader to function as a vertex shader or a pixel shader, and wherein said computational subunit is dynamically reconfigured from the initial configuration of shader type to function as another shader type for load balancing among a plurality of other computational subunits.

40. The graphics processing unit of claim 39, wherein if the optional stream output of the first computation subunit is enabled, said at least one output stream of graphics data is output to the processor-readable portion of graphics memory.

41. The graphics processing unit of claim 39, wherein said at least one output stream of graphics data is output to said processor-readable portion of graphics memory for recirculation to the input of the first computational subunit.

42. The graphics processing unit of claim 39, wherein said input component receives at least one input stream of graphics primitives data.

43. The graphics processing unit of claim 42, wherein the at least one input stream of graphics primitives data includes any of a stream of vertices, a stream of sets of two related vertices and a stream of sets of three related vertices.

44. The graphics processing unit of claim 39, wherein said processing unit generates additional geometry for inclusion in said at least one output stream of graphics data.

45. A co-processing unit, comprising a graphics processing unit, in a computing system, for performing shading on at least one stream of graphics data, comprising:

means for receiving at least one input stream of graphics data by at least one input of a programmable subunit of the GPU;

means for performing computation on the at least one input stream of graphics data to generate at least one output stream of graphics data based on programmatic instructions downloaded to the programmable subunit; and means for outputting said at least one output stream of graphics data to a stream output portion of video memory via a stream output of said programmable subunit based on at least one instruction of said programmatic instructions such that said at least one output stream of graphics data is accessible by host processor read operations, wherein said stream output portion of video memory is different than a storing means for rasterizing; and wherein said programmable subunit generates a new geometry for said output stream of graphics data, wherein said programmable subunit is initially configured as either a vertex shader, a pixel shader or a geometry shader, and wherein said programmable subunit is capable of being dynamically reconfigured from a vertex shader to function as a pixel shader or a geometry shader, and is capable of being dynamically reconfigured from a pixel shader to function as a vertex shader or a geometry shader, and is capable of being dynamically reconfigured from a geometry shader to function as a vertex shader or a pixel shader; and means for dynamically reconfiguring the programmable subunit from the initial configuration of shader type to function as another shader type for load balancing among a plurality of other programmable subunits.

46. A co-processing unit, comprising a graphics processing unit, in a computing system, for performing shading on at least one stream of graphics data, comprising:

means for receiving at least one input stream of graphics data to a first computational subunit of the GPU;

means for performing computation on the at least one input stream of graphics data by said first computational subunit to generate at least one output stream of graphics data; and means for outputting said at least one output stream of graphics data to a processor-readable portion of graphics memory prior to inputting said at least one output stream of graphics data to a second computational subunit of the GPU;

wherein said first computational subunit generates a new geometry for said output stream of graphics data, and wherein said first and second subunits are initially individually configured as either a vertex shader, a pixel shader or a geometry shader, and wherein said first and second computation subunits are capable of being dynamically reconfigured from a vertex shader to function as a pixel shader or a geometry shader, and are capable of being dynamically reconfigured from a pixel shader to function as a vertex shader or a geometry shader, and are capable of being dynamically reconfigured from a geometry shader to function as a vertex shader or a pixel shader; and means for dynamically reconfiguring the first and second subunits from the initial configuration of shader type to each function as another shader type for load balancing among a plurality of other subunits.

47. A co-processing unit, comprising a graphics processing unit, in a computing system, for performing shading on at least one stream of graphics data, comprising:

means for receiving at least one input stream of graphics data by a first computational subunit of the GPU;

means for performing computation on the at least one input stream of graphics data by said first computational subunit to generate at least one output stream of graphics data;

means for outputting said at least one output stream of graphics data to a processor-readable portion of graphics memory if a stream output of the first computation subunit is enabled; and means for outputting said at least one output stream of graphics data to a second computational subunit of the GPU for further processing;

wherein said first computational subunit generates a new geometry for said output stream of graphics data, and wherein said first and second subunits are initially individually configured as either a vertex shader, a pixel shader or a geometry shader, and wherein said first and second computation subunits are capable of being dynamically reconfigured from a vertex shader to function as a pixel shader or a geometry shader, and are capable of being dynamically reconfigured from a pixel shader to function as a vertex shader or a geometry shader, and are capable of being dynamically reconfigured from a geometry shader to function as a vertex shader or a pixel shader; and means for dynamically reconfiguring the first and second subunits from the initial configuration of shader type to each function as another shader type for load balancing among a plurality of other subunits.

48. A method for an application programming interface (API) for specifying instructions for execution by a plurality of computational subunits of a graphics processing unit (GPU) on behalf of a host processor, comprising:

specifying via the API at least one input stream of graphics data for computation to be performed by a first computational subunit of the GPU;

specifying via the API at least one function to be performed on the at least one input stream of graphics data by said first computational subunit to generate at least one output stream of graphics data; and specifying via the API whether (A) a stream output, a transport for storing said at least one output stream of graphics data in a processor-readable portion of graphics memory, of said first computational unit receives said at least one output stream of graphics data and (B) a second computational unit substantially simultaneously receives said at least one output stream of graphics data;

wherein said first computational subunit generates a new geometry for said output stream of graphics data, and wherein said first and second subunits are initially individually configured as either a vertex shader, a pixel shader or a geometry shader, and wherein said first and second computation subunits are capable of being dynamically reconfigured from a vertex shader to function as a pixel shader or a geometry shader, and are capable of being dynamically reconfigured from a pixel shader to function as a vertex shader or a geometry shader, and are capable of being dynamically reconfigured from a geometry shader to function as a vertex shader or a pixel shader; and dynamically reconfiguring the first and second subunits from the initial configuration of shader type to each function as another shader type for load balancing among a plurality of other subunits.

49. The method of claim 48, further including:

specifying via the API to which of the plurality of computational subunits of the GPU the at least one output stream of graphics data is to be recirculated from said processor-readable portion of graphics memory.

* * * * *